United States Patent [19]

Kishino et al.

[11] Patent Number: 5,068,784
[45] Date of Patent: Nov. 26, 1991

[54] METHOD AND SYSTEM FOR MONITORING THE NUMBER OF AVAILABLE BUFFERS

[75] Inventors: Kuniaki Kishino; Tamiya Nakamura, both of Tokyo, Japan

[73] Assignee: Oki Electric Industry Co., Ltd., Tokyo, Japan

[21] Appl. No.: 382,316

[22] Filed: Jul. 20, 1989

[30] Foreign Application Priority Data

Jul. 28, 1988 [JP] Japan .................................. 186791

[51] Int. Cl.$^5$ .......................... G06F 7/00; G06F 7/02
[52] U.S. Cl. .................................. 395/275; 364/239; 364/239.8; 364/266.6; 364/939.6; 364/941.1; 364/DIG. 1; 364/DIG. 2; 371/67.1
[58] Field of Search .................. 364/200, 239, 239.8, 364/266.6, 900, 941.1, 939.6; 371/67.1

[56] References Cited

U.S. PATENT DOCUMENTS

| | | | |
|---|---|---|---|
| 4,378,588 | 3/1983 | Katzman et al. | 364/200 |
| 4,754,399 | 6/1988 | Yamamoto et al. | 364/200 |
| 4,845,710 | 7/1989 | Nakamura et al. | 370/110.1 |

Primary Examiner—Allen R. MacDonald
Assistant Examiner—Glenn A. Auve
Attorney, Agent, or Firm—Spencer & Frank

[57] ABSTRACT

A method and a system for monitoring the number of available buffers in a memory field. A signal indicative of the number of available buffers is provided to at least one comparator circuit and compared to at least one predetermined value representative of a limit on a range of numbers of available buffers, and previously stored in at least one D-latch circuit. An interrupt controller, responsive to the result of the comparison, outputs an interrupt signal to notify a microcomputer having an interrupt input port that the number of buffers is outside a range defined by the limit value.

13 Claims, 4 Drawing Sheets

METHOD AND SYSTEM FOR MONITORING THE NUMBER OF AVAILABLE BUFFERS

BACKGROUND OF THE INVENTION

1. Field of the invention

This invention relates to a buffer monitoring system and more especially a peripheral buffer monitoring system coupled to a microcomputer having at least one interrupt input port which has to capture/release the buffers frequently.

2. Brief description of the related art

A mapped Input/Output (I/O) control method or a memory mapped I/O control method is utilized in a microcomputer system. According to such a method, every peripheral I/O device is assigned to a corresponding special area in a memory field as its own buffer and is accessed by the microcomputer in the same way as a usual memory address.

If there are many I/O devices to be handled and memory areas of a memory field are assigned as their buffers, a special buffer controller is required to control their priority or buffer number to avoid a shortage of available memory areas and/or to control the total throughput of the system.

FIG. 1 shows a general block diagram of a conventional buffer control system coupled to a microcomputer system utilized in a data transmission/reception system. In this figure, a buffer controller (BC) 10 is operatively connected to peripheral I/O devices 12 for controlling their buffers, which are assigned in a memory (not shown). The buffer controller 10 which can store the number of available buffers and addresses of the buffers, and outputs a digital buffer number signal BN, representing the number of available buffers. An I/O controller (hereafter, IOC) 14 for controlling the I/O devices, receives the signal BN and if requested, writes predetermined data in the buffer and reads data from the buffer. A bus line 16, shown in partly omitted form in FIG. 1, connects main devices such as a read only memory ROM (not shown) a random access memory RAM (not shown) to each other and to a central processing unit 18 (hereafter, CPU) which provides overall control of the system.

In this system, the buffer controller 10 monitors the status of the I/O devices 12. If the buffer controller 10 receives a buffer request from an I/O device 12, the buffer controller 10 assigns the I/O device to an available buffer and subtracts 1 from the previously stored available buffer number which was initially set by the CPU 18, and rewrites the stored addresses of available buffers. On the other hand, if another I/O device releases its buffer, the buffer controller 10 adds 1 to the available buffer number.

As to the job of the CPU 18, whenever the CPU 18 has to know the number of available buffers, it has to read the number from the buffer controller 10 via the IOC 14 using an appropriate and conventional "READ" operation. Therefore, if the CPU 18 performs a special function such as controlling a telephone switching system having a large number of I/O devices, which need frequent exchanging and frequent capturing/releasing of buffers, the CPU 18 has to repeat such "READ" operations a number of times in a short interval, even if the number of available buffers has not changed, in order to manage the available buffers. Generally, READ/WRITE operations executed in a usual CPU, such as a microcomputer, consumes more execution time (clock cycles) than the other operations. This severely limits the total throughput of the system.

The invention is invented to eliminate the above limitation on system throughput.

SUMMARY OF THE INVENTION

An object of our invention is to provide a buffer monitoring method in which there is no need to synchronize the buffer controller with the CPU or to provide cooperation of the buffer controller to the usual other operations of the central processing unit. Hence, the total throughput of the system is substantially increased.

Another object of the invention to realize a system which executes the method. This object is realized with a system which is capable of controlling the number of available buffers between two desired values, using a plurality of D-latch circuits and comparator circuits coupled to them.

A method for monitoring the number of available buffers in accordance with the invention is executed in a system coupled to a central processing unit (CPU) having at least one interrupt input port. The method comprises the steps of (a) storing a predetermined value representing a limit on a range of the number of available buffers and producing a first signal representing the predetermined value, (b) monitoring the status of each buffers and producing a second signal representing the number of buffers currently available, (c) comparing the first signal and the second signal and producing a third signal representing a relation between the first signal and the second signal, (d) repeating the steps (b) and (c) at predetermined time intervals, and, (e) producing an interrupt signal in response to the third signal representing a predetermined amount of change in the number of available buffers, and providing the interrupt signal to the interrupt input port of the CPU to notify the CPU that the number of available buffers has increased or decreased by a predetermined amount.

Further, according to the invention there is provided a system for executing the above mentioned method, that is, a system for monitoring the number of available buffers, which is coupled to a CPU having at least one interrupt input port. Such a system comprises (a) at least one D-latch circuit for memorizing a predetermined number and outputting a first signal representing a magnitude of the predetermined number, (b) a buffer controller for monitoring the status of each buffer and outputting a second signal representing a number of available buffers, (c) at least one comparator, operatively coupled to the D-latch circuit and the buffer controller, for receiving the first signal and the second signal, the comparator comparing the first signal and the second signal and producing a third signal representing a relation between the first signal and the second signal, and (d) an interrupt controller, operatively coupled to the comparator, for producing an interrupt signal in response to the third signal, the interrupt controller providing the interrupt signal to the interrupt port of the CPU to notify the CPU that the number of available buffers is increasing or decreasing.

If necessary, it could be possible to increase the number of D-latch circuits or the number of comparators. Further, the method can be realized by utilizing software interruption with a microcomputer capable of software interruption.

DESCRIPTION OF THE PREFERRED EMBODIMENT

Figure 1:
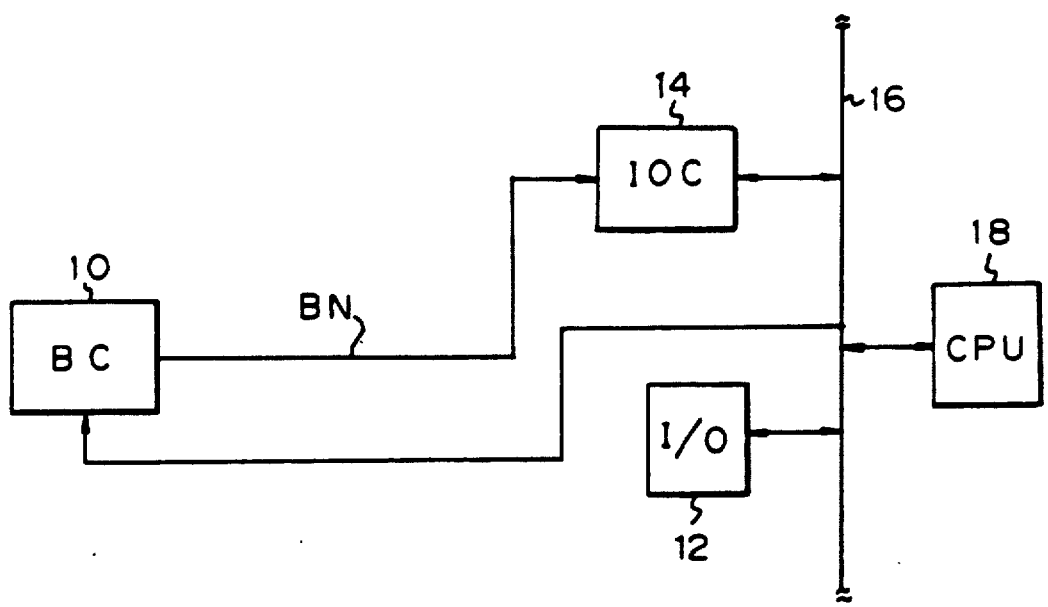
FIG. 1 shows a general block diagram of an example of a conventional buffer control system.
Figure 2:
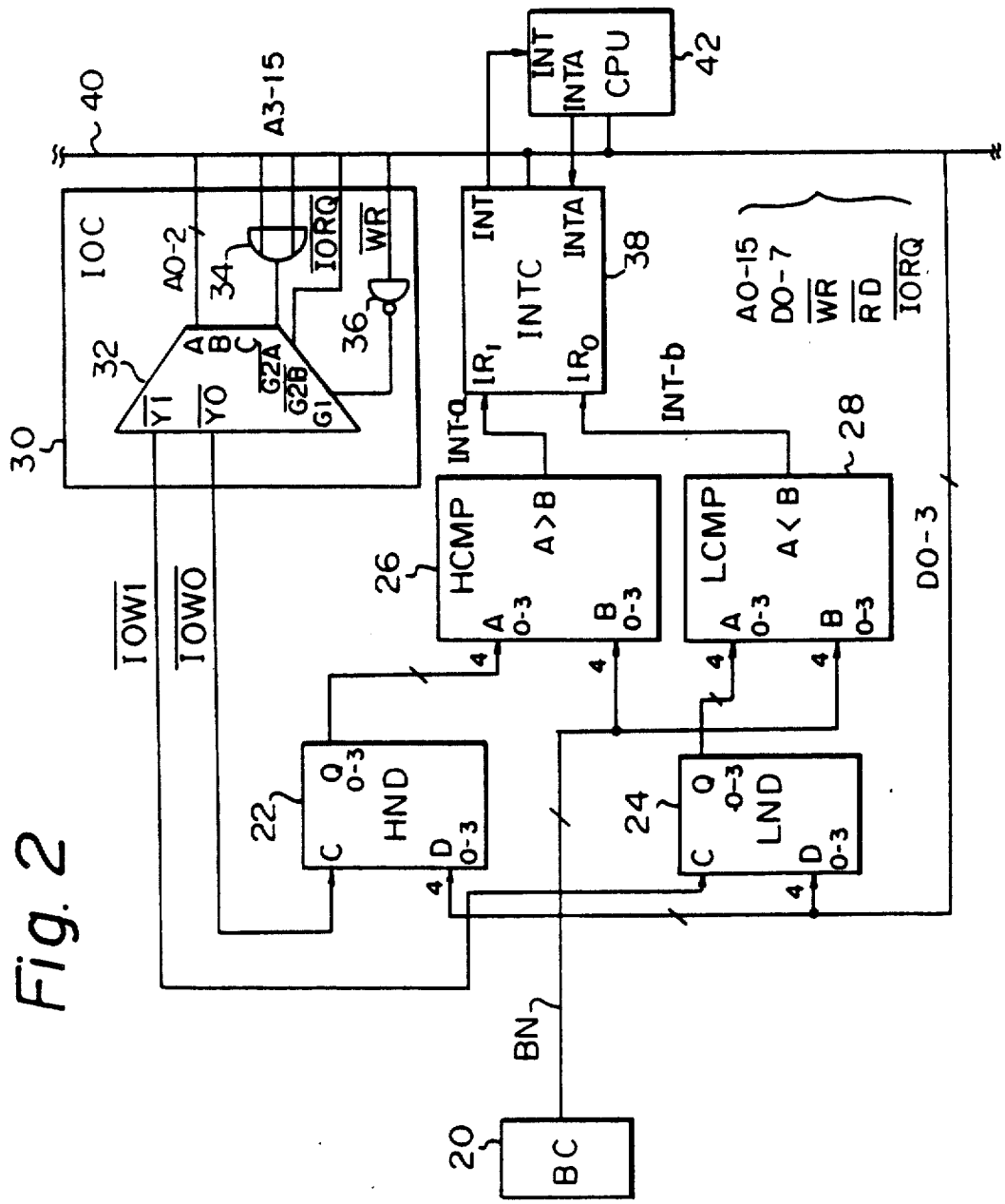
FIG. 2 is a detailed block diagram of a preferred embodiment of the invention.

FIG. 2 shows a preferred embodiment of the system according to the invention. A buffer controller (BC) 20 has similar functions to the conventional buffer controller 10 in FIG. 1 and outputs a buffer number signal BN comprising a 4 bit digital signal which represents the number of available buffers. A high number D-latch circuit (HND) 22 for storing an upper limit of the available number of buffers in 4-bit digital form receives the upper limit via input port D and outputs it via output port Q according to a clock (write enable) signal IOW0 provided to a clock port C. A low number D-latch circuit (LND) 24 for storing a lower limit of the available buffer number in 4-bit digital form receives the lower limit via input port D and outputs it via output port Q according to a clock (write enable) signal IOW1 provided to a clock port C. These D-latch circuits could be realized by appropriate ICs, such as Texas Instruments' 74LS175 Quad D-type Flip-Flop.

A high number comparing circuit (HCMP) 26 compares the respective magnitudes of the 4-bit signal BN and the 4-bit upper limit. A low number comparing circuit (hereafter, LCMP) 28 compares the magnitude of the 4-bit signal BN and the 4-bit lower limit. These comparing circuits are realized with an IC, such as Texas Instruments' 74LS85 Magnitude Comparator.

An input/output controller (IOC) 30 controls the input/output operation of the system. In this embodiment, the IOC 30 comprises a decoder 32, an OR gate 34 having 13 input ports, and a NAND gate 36 having a single input port. This IOC 30 is realized by using an IC, such as Texas Instruments' 74LS138 3 to 8 Line Decoder.

An interrupt controller (INTC) 38 controls the interruption operation of the system. This interrupt controller is realized with an IC, such as Intel's 8259A.

A bus line 40 connects main devices with each other. As shown in the figure, the bus line 40 comprises address buses A0 to A15, data buses D0 to D7, a write request line $\overline{WR}$, a read request line $\overline{RD}$, and an input-/output request line $\overline{IORQ}$.

A central processing unit (hereafter, CPU) 42 in the system has an interrupt input port INT and an interrupt acknowledge output port INTA. This CPU can be realized with an IC, such as Zilog's Z80.

An operation of the above-described system will be explained with the aid of the general flow chart in FIG. 3.

(Step 1)

Figure 3:
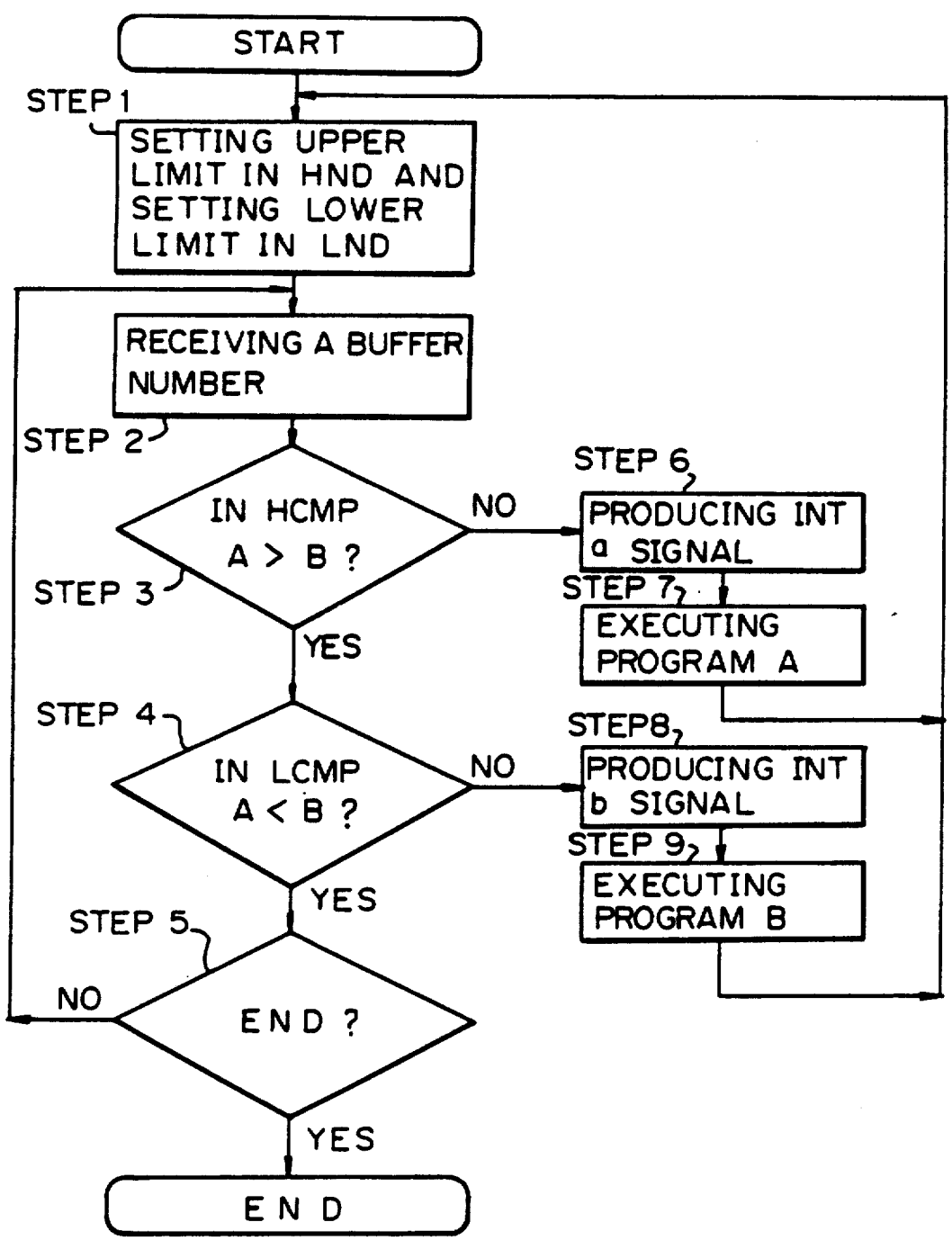
FIG. 3 is a general flow chart for explaining how to proceed with the invention.

Referring to FIG. 3, at first, the CPU 42 with the aid of the input/output controller 30 sets the upper limit of the number of buffers stored as 4-bit digital data in HND 22 and also sets the lower limit in LND 24. In detail, in response to a command from CPU 42, the input/output controller 30 enables the HND 22 and the LND 24, via their data port buses D0 to D3, to write respective upper and lower limits of the number of available buffers using the write enable signals IOW1 and IOW0, each of the D-latch circuits stores the limit value input thereto and outputs its that value from each output port Q.

(Step 2)

The buffer controller 20 sends a 4-bit signal BN to the input ports B of the HCMP 26 and LCMP 28.

(Step 3)

In the HCMP 26, the received signal BN is compared with the value sent to port A from the HND 22. If the value from port A is larger than that from the port B, the steps go next to the step 4. If not, the steps go to the step 6.

(Step 4)

In the LCMP 28, the signal BN received at the port B is compared with the value sent to port A from LND 24. If the value from port A is smaller than that from port B, the steps go next to step 5. If not, the steps go to the step 6.

(Step 5)

The step 5 shows a typical end of a loop processing, wherein usually the system repeats the steps 2, 3, 4.

(Step 6)

If in the step 3, the value received at port B is larger than that at port A, in other words, the number of available buffers BN exceeds the upper limit of the buffer number held in HND 22, the HCMP produces an inte request signal (INT-a).

The signal INT-a is input to interrupt request port $IR_1$ of the INTC 38. In response, the INTC 38 requests CPU 42 to accept interruption and to perform a predetermined program A, such as increasing the upper limit to a much higher value.

(Step 7)

Upon completion of the step 6, the CPU 42 acknowledges the interruption via the acknowledge output port INTA, and immediately performs the Program A (re-setting the upper limit and returning to the Step 1).

(Step 8)

If in the step 4, the value received at port B is smaller than that at port A, in other words, the number BN falls short of the lower limit held in the LND 24, the LCMP produces an interrupt request signal (INT-b).

The signal INT-b is input to interrupt request port $IR_0$ of the INTC 38. In response to the signal INT-b, the INTC 38 requests the CPU 42 to accept interruption and to perform another predetermined program B, such as reducing the previous lower limit to a smaller value.

(Step 9)

Upon completion of the step 8, the CPU 42 acknowledge the interruption via acknowledge output port INTA and immediately perform the Program B (re-setting the lower limit and returning to the Step 1).

Usually, if the number of available buffers is between the upper limit and lower limit, the CPU does not need to check the numbers at short intervals. If it occurs that the buffer number BN exceed or falls below the range between the upper and lower limits, the CPU 42 will be informed by an interrupt signal. Therefore, the throughput of the CPU 42 is increased.

Figure 4:
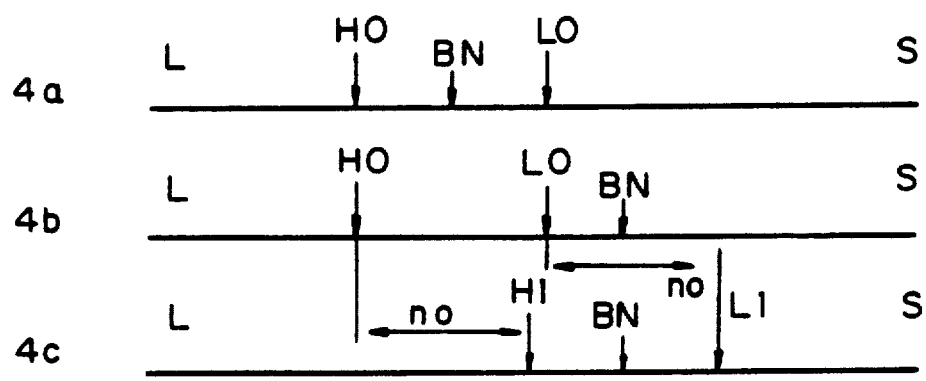
FIG. 4 is a chart for explaining an operation of the invention shown in FIG. 2.
Figure 5:
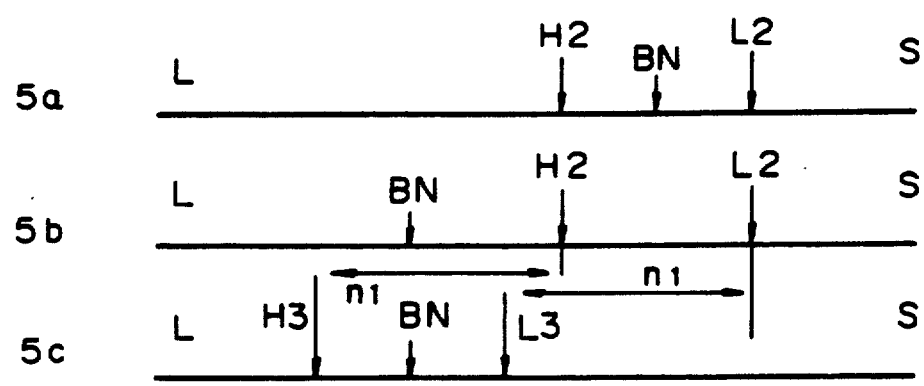
FIG. 5 is another chart for explaining another operation of the invention shown in FIG. 2.

Examples of the above-described operations are illustrated in FIG. 4 and FIG. 5. In those figures, the horizontal axis shows numbers of buffers which are controlled by the system. The left portion marked "L" designates large number and the right portion marked "S" designates small numbers.

In FIG. 4, in status 4a, at first the number BN is at an intermediate value of the numbers and initially, the CPU 42 sets the upper limit H0 and the lower limit L0 on opposite sides.

In the next status 4b, if the number BN decreases to a value below the lower limit L0, the CPU 42 is informed of that by the interrupt signal INT-b and performs Program B. For example, the CPU 42 subtracts a predetermined number n0 from L0 and to set a new lower limit L1. Further, if necessary, it will be possible to perform another program such as simultaneously subtracting the number n0 from H0 to set a new upper limit H1, as shown in status 4c.

FIG. 5 shows a case in which the number BN increases to a value above the upper limit H1. In the status 5a, at first, the number BN is at an intermediate value of the numbers and initially, the CPU 42 sets an upper limit H2 and a lower limit L2 on opposite sides.

In the next status, if the number BN increases and passes the upper limit H2, the CPU 42 is informed of that by the interrupt signal INT-a and performs Program A. For example, the CPU 42 adds a predetermined number n1 to H2 to set a new upper limit H3. Further, if necessary, it will be possible to perform another program such as simultaneously adding the number n1 to L2 to set a new lower limit L3, as shown in the status 5c.

The invention, now being fully described, it will be apparent to one of ordinary skill in the art that changes and modification can be made thereto without departing from the spirit or scope of the invention as set forth therein. For example, in either of the cases shown in FIGS. 4 and 5, each of numbers n0 and n1 can be varied individually and the upper limit and the lower limit can be set at different distances from the buffer number BN. Such changes and modifications are intended to be comprehended by the meaning and equivalents of the appended claims.

What is claimed is:

1. A method for monitoring buffers in a memory coupled to a central processing unit having an interrupt input port, the method comprising the steps of:
   (a) storing a predetermined limit value on a range of numbers of available buffers and producing a first signal indicative of the limit value;
   (b) monitoring availability of the buffers and producing a second signal indicative of a number of the buffers which are available;
   (c) comparing the first signal with the second signal and producing a third signal indicative of whether the number of available buffers is beyond the limit value relative to the range;
   (d) repeating said steps (b) and (c) at predetermined time intervals; and,
   (e) producing an interrupt signal if the third signal is indicative that the number of available buffers is beyond the limit value relative to the range, and providing the interrupt signal to the interrupt input port of the central processing unit.

2. A method for monitoring buffers according to claim 1, wherein the first signal and the second signal are digital signals having an identical number of bits.

3. A method for monitoring buffers according to claim 2, wherein said step of storing comprises the step of storing an upper limit value on the range of available buffers, and said step of comparing comprises the step of producing the third signal if the number of available buffers exceeds the upper limit value.

4. A method for monitoring buffers according to claim 2, wherein said step of storing comprises the step of storing a lower limit value on the range of available buffers, and said step of comparing comprises the step of producing the third signal if the number of available buffers falls short of the lower limit value.

5. A method for monitoring buffers according to claim 1, wherein said step of storing comprises the step of storing an upper limit value on the range of available buffers, and said step of comparing comprises the step of producing the third signal if the number of available buffers exceeds the upper limit value.

6. A method for monitoring buffers according to claim 1, wherein said step of storing comprises the step of storing a lower limit value on the range of available buffers, and said step of comparing comprises the step of producing the third signal if the number of available buffers falls short of the lower limit value.

7. A method for monitoring buffers in a system coupled to a central processing unit having at least one interrupt input port, the method comprising the steps of:
   (a) storing an upper limit value and producing a first signal indicative of the upper limit value;
   (b) storing a lower limit value which is lower than the upper limit value and producing a second signal indicative of the lower limit value, the upper and lower limit values defining therebetween a range of numerical values;
   (c) monitoring availability of the buffers and producing a third signal indicative of a number of available buffers;
   (d) comparing the first signal with the third signal and producing a fourth signal indicative of whether the number of available buffers exceeds the upper limit value;
   (e) comparing the second signal with the third signal and producing a fifth signal indicative of whether the number of available buffers is less than the lower limit value;
   (f) repeating said steps (c), (d) and (e) at predetermined intervals; and
   (g) producing at least one interrupt signal when either one of said fourth and fifth signals indicates that the number of available buffers is outside of the range of numerical values.

8. A method for monitoring buffers according to claim 7, wherein the first signal, the second signal and the third signal are digital signals having an identical number of bits.

9. In a system for monitoring buffers coupled to a central processing unit having at least one interrupt input port, the system comprising:
   (a) means for storing a predetermined limit value on a range of numbers of available buffers and outputting a first signal representing a magnitude of the limit value;

(b) means for monitoring availability of the buffers and outputting a second signal indicative of a number of the buffers which are available;

(c) means, coupled to said monitoring means and said storing means, for comparing the first signal with the second signal to produce a third signal indicative of whether the number of available buffers is beyond the limit value relative to the range;

(d) means, coupled to said comparing means, for producing an interrupt signal when the third signal is indicative that the number of available buffers is beyond the limit value relative to the range, and providing the interrupt signal to said interrupt port of the central processing unit.

10. A system for monitoring buffers according to claim 9, wherein said storing means comprises a D-latch circuit.

11. A system for monitoring buffers according to claim 9, wherein said storing means comprises means for storing an upper limit value on the range of available buffers, and said comparing means comprises means for producing the third signal if the number of available buffers exceeds the upper limit value.

12. A system for monitoring buffers according to claim 9, wherein said storing means comprises means for storing a lower limit value on the range of available buffers, and said comparing means comprises means for producing the third signal if the number of available buffers falls short of the lower limit value.

13. A system for monitoring buffers coupled to a central processing unit having at least one interrupt input port, the system comprising:

(a) a first storing means for storing an upper limit value and producing a first signal indicative of the upper limit value;

(b) a second storing means for storing a lower limit value which is below the upper limit value and producing a second signal indicative of the lower limit value, the upper and lower values defining therebetween a range of numerical values;

(c) a buffer control means for monitoring availability of the buffers and producing a third signal indicative of a number of the buffers which are available;

(d) a first comparing means, coupled to said first storing means and said buffer control means, for comparing the first signal and the third signal and producing a fourth signal indicative of whether the number of available buffers is above the upper limit value;

(e) a second comparing means, coupled to said second storing means and said buffer control means for comparing the second signal with the third signal and producing a fifth signal indicative of whether the number of available buffers is below the lower limit value; and (f) an interrupt control means, coupled to said first comparing means and said second comparing means, for producing an interrupt signal when either one of the fourth and fifth signals indicates that the number of available buffers is outside of the range of values.

* * * * *